E. C. Green,
Derrick,
No. 63,037. Patented Mar. 19, 1867.
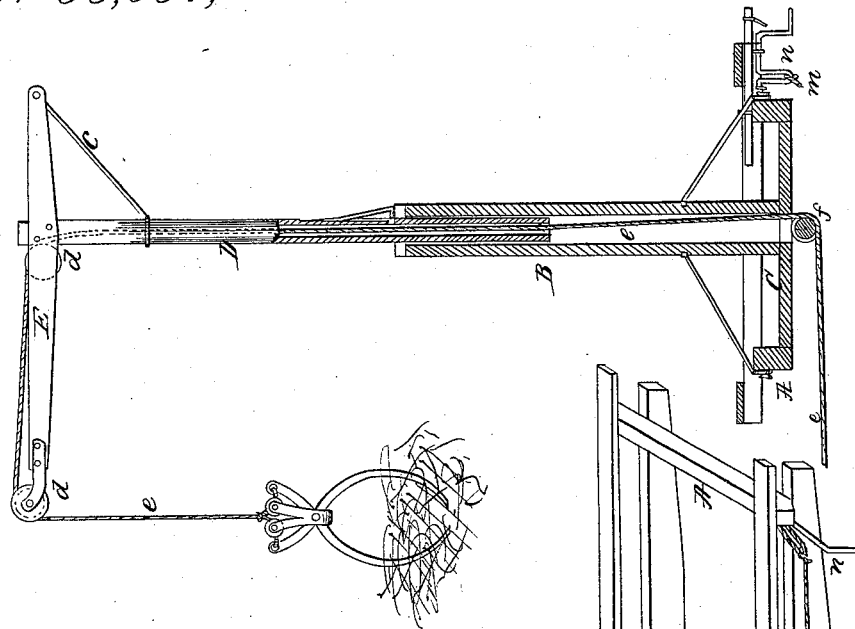
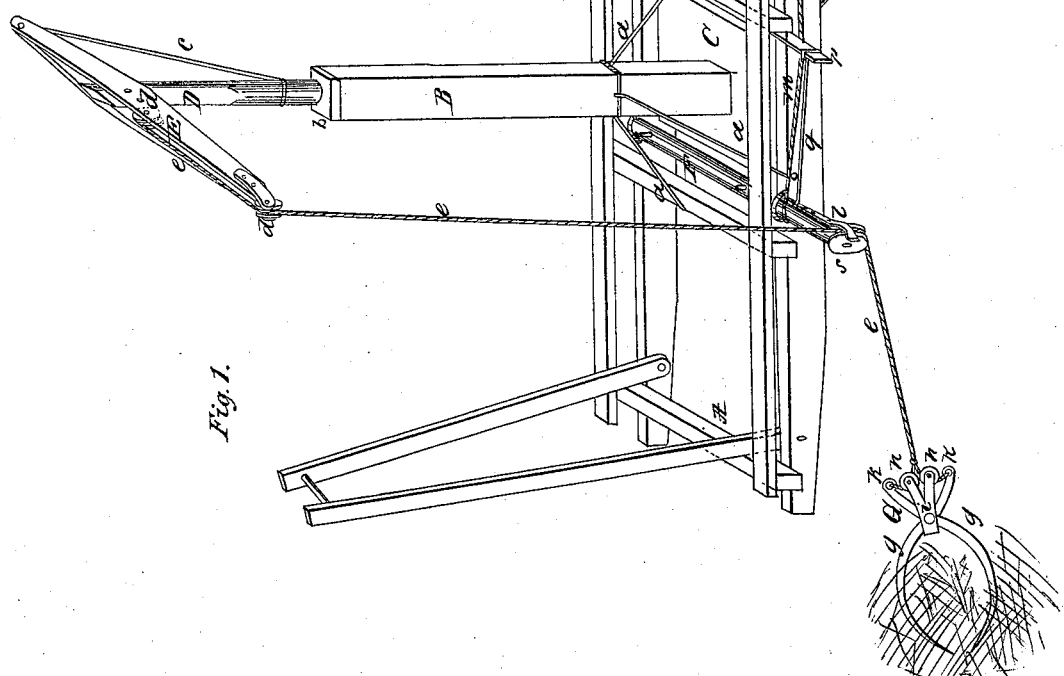

United States Patent Office.

E. C. GREEN, OF PLAINFIELD, INDIANA.

Letters Patent No. 63,037, dated March 19, 1867.

---

IMPROVEMENT IN HAY ELEVATORS.

---

The Schedule referred to in these Letters Patent and making part of the same.

---

TO ALL WHOM IT MAY CONCERN:

Be it known that I, E. C. GREEN, of Plainfield, in the county of Hendricks, and State of Indiana, have invented a new and useful Improvement in Hay Loader; and I do hereby declare that the following is a full, clear, and exact description thereof, which will enable others skilled in the art to make and use the same, reference being had to the accompanying drawings, forming part of this specification, in which—

Figure 1 is a perspective side view of my hay-loading apparatus.

Figure 2, a transverse vertical section of the same.

Similar letters of reference indicate like parts.

The object of this invention is to load hay or corn-fodder upon wagons, either from the shock or the windrow in the field; and it consists in a light, portable frame to be set upon the running gear of a wagon, connected with which frame is a hollow central post enclosing a sliding and revolving upright, on the top of which is a cross-bar, forming a kind of crane or derrick for swinging around to take up and drop a bundle of hay on opposite sides of a wagon, as desired, and rising higher as the hay is loaded by means of a horse hay-fork worked by a rope and pulleys.

In the centre of the frame or bed A A, stands an upright hollow post, B, made by preference of inch plank, about seven inches square and six and a half feet long, the foot of which is stepped into a cross-plate, C; it is supported also by braces $a\,a\,a\,a$. On the upper end of the post B is a cap, $b$, through the middle of which passes a round standard, D, the lower end of which reaches down to the bottom of the square post B, within which it turns around and slides up and down like a piston, by means of a suitable head fitting in the inside of the hollow post B. The centre standard D projects several feet above the top of the post B, and on its upper end is fastened a cross-arm, E, projecting on one side about four feet and a half, and on the other side about one foot and a half; it is supported at the bottom by one or more braces, $c$. On the long end of the cross-arm E are placed two vertical pulleys, $d\,d$, one at the extremity and the other near its connection with the centre standard D. The standard D has a hole bored through it from end to end for receiving a hoisting rope, $e$, which passes over the pulleys $d\,d$, and down through the hole to the under side of the cross-plate C, where it passes around another pulley, $f$, and, running along the ground at right angles to the frame A, is hitched to a horse for loading the hay. On the other end of the rope $e$ is attached a horse hay-rake, G, formed of the curved prongs $g\,g$, which are closed and opened by means of two strands on the end of the rope, which pass over two small pulleys, $h\,h$, fixed in the ends of a double stationary fork, $i$, to which the prongs $g\,g$ are pivoted, the two strands of rope being fastened to the projecting heads $k\,k$, of the prongs $g\,g$, to close them when the rope $e$ is pulled.

Just forward of the centre post B, a round slide-bar, F, lies crosswise on the bed A, which is moved in and out, as desired for loading, on the outer end of which bar is a pulley, $s$, over which the rope $e$ passes to bring the draught near the ground when the hay is to be taken from the windrow and drawn to the wagon. A light spring, $l$, on the end of the slide-roller F holds the rope against the side of the pulley while the hay is drawn from the windrow; the spring becomes inoperative and the rope is released from the pulley in order to hoist the hay upon the wagon by giving the slide-roller F a half turn upward, which is done by means of a rope, $m$, fastened to the bar and connected with a crank or lever, $n$, at the rear end of the frame. A spring, $p$, connected with the bar F, by the rod $q$, turns it back again in place, when the rope $m$ is released.

The operation of the apparatus is obvious and requires no further explanation. The centre standard D is raised as the hay is loaded on the wagon, and is held in place by a spring-catch placed on the cap $b$, and when the load is completed it is lowered so that the wagon can drive into the barn with the load of hay.

Having described my invention, what I claim as new, and desire to secure by Letters Patent, is—

1. I claim the hoisting apparatus herein described, in combination with the wagon-bed A, arranged and operating substantially as and for the purposes herein specified.

2. I claim the hollow centre post B, enclosing the hollow centre standard D, with its cross-arm E, and pulleys $d\,d$, in combination with the slide-roller F, with its pulley $s$, and spring $l$, connected with the horse rake G, and operated by the rope $e$, constructed, arranged, and operating together substantially as and for the purposes herein described.

3. I claim the crank $n$, in combination with the slide-roller F, and the spring $p$, constructed and arranged substantially as and for the purposes set forth.

E. C. GREEN.

Witnesses:
W. L. VESTAL,
A. D. TANSEY.